(12) United States Patent
Papo et al.

(10) Patent No.: US 10,505,758 B2
(45) Date of Patent: Dec. 10, 2019

(54) SYSTEMS AND METHODS FOR SHARING NETWORK INTERFACES BETWEEN CONTAINERS IN AN EMBEDDED COMPUTING DEVICE

(71) Applicant: Huawei Technologies Co., Ltd., Shenzhen (CN)

(72) Inventors: Aleksandar Papo, Waterloo (CA); Nazih Almalki, Waterloo (CA)

(73) Assignee: Huawei Technologies Co., Ltd., Shenzhen (CN)

(*) Notice: Subject to any disclaimer, the term of this patent is extended or adjusted under 35 U.S.C. 154(b) by 60 days.

(21) Appl. No.: 15/642,476

(22) Filed: Jul. 6, 2017

(65) Prior Publication Data

US 2019/0013963 A1  Jan. 10, 2019

(51) Int. Cl.
*H04L 12/26* (2006.01)
*H04L 12/46* (2006.01)
*G06F 9/455* (2018.01)
*G06F 9/54* (2006.01)

(52) U.S. Cl.
CPC ......... *H04L 12/4625* (2013.01); *G06F 9/455* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 7,461,148 B1 * | 12/2008 | Beloussov | ............ | G06F 9/5077 703/22 |
| 7,478,173 B1 * | 1/2009 | Delco | ................ | H04L 12/2865 709/250 |
| 8,194,667 B2 * | 6/2012 | Belgaied | ............ | H04L 49/9063 370/392 |
| 9,886,300 B2 * | 2/2018 | Nakatsu | ............ | G06F 9/45558 |
| 10,027,351 B1 * | 7/2018 | Qureshi | ............... | H04B 1/0003 |
| 10,073,691 B2 * | 9/2018 | Dake | ........................ | G06F 8/65 |
| 10,078,527 B2 * | 9/2018 | Han | .................... | G06F 9/45558 |
| 2005/0039180 A1 | 2/2005 | Fultheim et al. | | |
| 2007/0033260 A1 | 2/2007 | Grouzdev et al. | | |
| 2008/0043765 A1 * | 2/2008 | Belgaied | ............ | H04L 12/4679 370/409 |
| 2008/0123676 A1 * | 5/2008 | Cummings | ........... | H04L 45/742 370/419 |
| 2009/0217260 A1 * | 8/2009 | Gebhart | .................... | G06F 8/62 717/174 |
| 2011/0314469 A1 | 12/2011 | Qian et al. | | |
| 2015/0195137 A1 * | 7/2015 | Kashyap | ............. | H04L 41/0893 370/254 |

(Continued)

FOREIGN PATENT DOCUMENTS

CN    101399830 A    4/2009

*Primary Examiner* — Kwang B Yao
*Assistant Examiner* — Juvena W Loo
(74) *Attorney, Agent, or Firm* — Slater Matsil, LLP

(57) ABSTRACT

Systems and methods are provided for sharing a network interface between operating systems in an embedded device. A host operating system provides a network bridge. First and second operating systems provide first and second respective shared network interfaces connected to the bridge. A first external network interface is linked to the first shared network interface via a control client. The first external network interface is shared with the second operating system.

20 Claims, 13 Drawing Sheets

(56) References Cited

U.S. PATENT DOCUMENTS

| | | | |
|---|---|---|---|
| 2015/0254088 A1* | 9/2015 | Chou | G06F 9/45541 709/212 |
| 2016/0182315 A1* | 6/2016 | Salokanto | H04L 41/5054 709/226 |
| 2016/0203008 A1* | 7/2016 | Cui | G06F 9/455 718/1 |
| 2016/0335107 A1* | 11/2016 | Behera | G06F 9/45558 |
| 2017/0052807 A1* | 2/2017 | Kristiansson | G06F 9/54 |
| 2017/0180249 A1* | 6/2017 | Shen | H04L 45/586 |
| 2017/0180250 A1* | 6/2017 | Shen | G06F 9/45558 |
| 2017/0353433 A1* | 12/2017 | Antony | H04L 49/70 |
| 2018/0063201 A1* | 3/2018 | Zhang | H04W 76/10 |

* cited by examiner

```
                                                          IP Table 532
    First OS Container:
    Network configuration:
    Remote_interface Link encap:Ethernet HWaddr aa:bb:cc:dd:ee:ff
             inet addr:1.0.60.20 Bcast:1.0.60.255 Mask:255.255.255.0
             inet6 addr: aaaa::aaaa:aaaa:aaaa:aaaa/64 Scope: Link
             UP BROADCAST RUNNING MULTICAST MTU:1500 Metric:1
             RX packets:23 errors:0 dropped:0 overruns:0 frame:0
             TX packets:8 errors:0 dropped:0 overruns:0 carrier:0
             collisions:0 txqueuelen:1000
910          RX bytes:1854 TX bytes:648

Shared_interface_1 Link encap:Ethernet HWaddr ff:00:11:22:33:44
             inet addr:1.0.2.1 Bcast:1.0.2.255 Mask:255.255.255.0
             inet6 addr: bbbb::bbbb:bbbb:bbbb:bbbb/64 Scope: Link
             UP BROADCAST RUNNING MULTICAST MTU:1500 Metric:1
             RX packets:6 errors:0 dropped:0 overruns:0 frame:0
             TX packets:6 errors:0 dropped:0 overruns:0 carrier:0
             collisions:0 txqueuelen:1000
             RX bytes:508 TX bytes:508

IP table setup:
920 busybox ip route add default via 1.0.2.2
```

FIG. 9A

```
                                                              IP Table 552
Second OS Container:
Network configuration:

tunnel Link encap:UNSPEC
        inet addr:10.10.140.12 P-t-P:10.10.140.12 Mask:255.255.255.0
        UP POINTOPOINT RUNNING MTU:1300 Metric:1
        RX packets:10 errors:0 dropped:0 overruns:0 frame:0
        TX packets:28 errors:0 dropped:0 overruns:0 carrier:0
        collisions:0 txqueuelen:500
        RX bytes:6046 TX bytes:8447

Wireless_lan Link encap:Ethernet HWaddr bb:cc:dd:ee:ff:00
        inet addr:1.16.9.18 Bcast:1.16.9.255 Mask:255.255.254.0
        inet6 addr: bbbb::cccc:dddd:eeee:ffff/64 Scope: Link
        UP BROADCAST RUNNING MULTICAST MTU:1400 Metric:1
        RX packets:429 errors:0 dropped:0 overruns:0 frame:0
        TX packets:484 errors:0 dropped:0 overruns:0 carrier:0
        collisions:0 txqueuelen:1000
        RX bytes:321174 TX bytes:73082

Shared_interface_2 Link encap:Ethernet HWaddr cc:dd:ee:ff:00:11
        inet addr:1.0.2.2 Bcast:1.0.2.255 Mask:255.255.255.0
        inet6 addr: cccc::dddd:eeee:ffff:0000/64 Scope: Link
        UP BROADCAST RUNNING MULTICAST MTU:1500 Metric:1
        RX packets:8 errors:0 dropped:0 overruns:0 frame:0
        TX packets:8 errors:0 dropped:0 overruns:0 carrier:0
        collisions:0 txqueuelen:1000
        RX bytes:648 TX bytes:648

IP table setup:

echo "1">/proc/sys/net/ipv4/ip_forward
iptables -P FORWARD DROP
iptables -F FORWARD
iptables -t nat -F
iptables -t nat -A POSTROUTING -s 1.0.2.2/24 -o tun0 -j MASQUERADE
iptables -A FORWARD -i tunnel -o shared_interface_2 -j ACCEPT
iptables -A FORWARD -o tunnel -i shared_interface_2 -j ACCEPT
ip rule add from 1.0.2.0/24 table tunnel
```

FIG. 9B

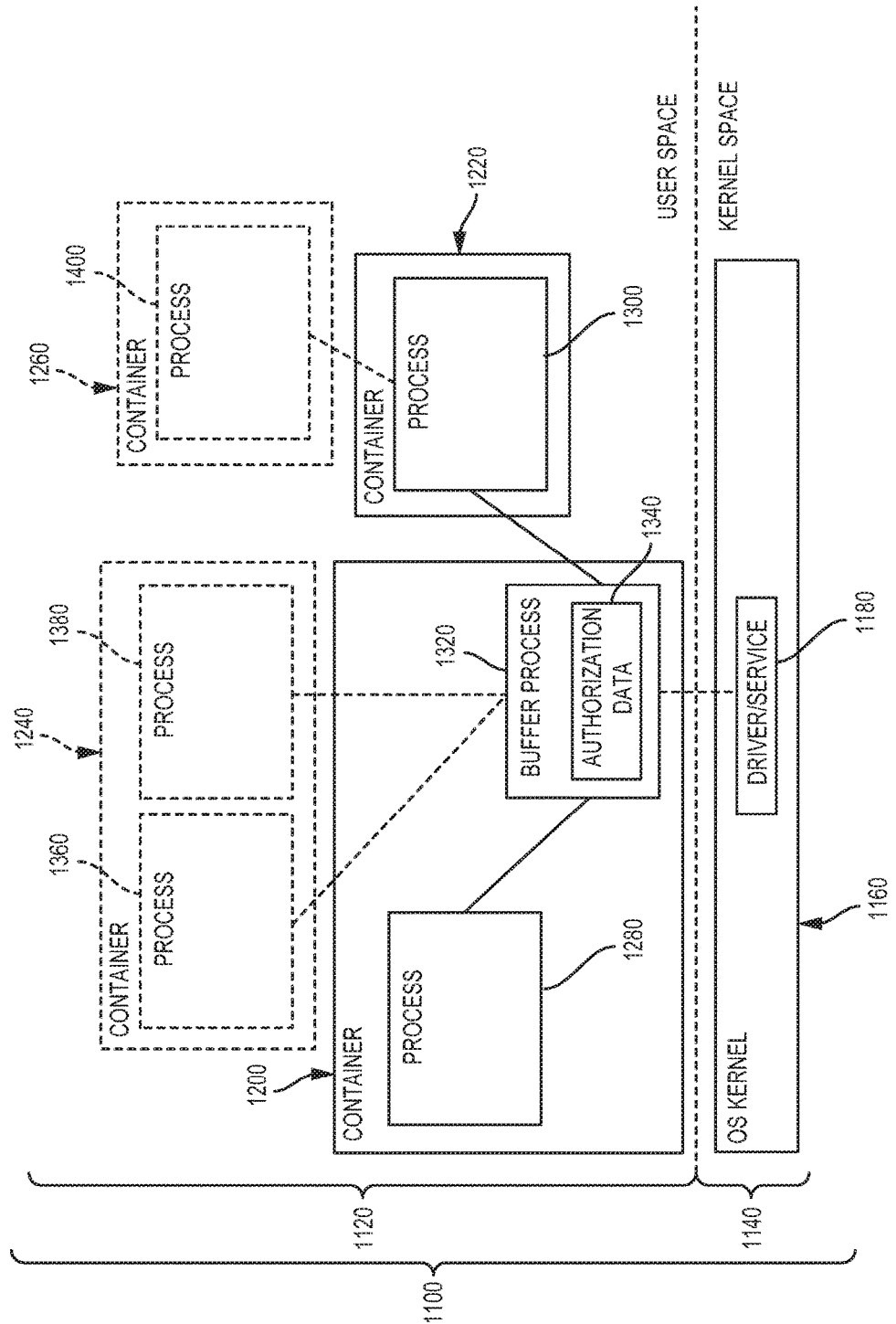

SYSTEMS AND METHODS FOR SHARING NETWORK INTERFACES BETWEEN CONTAINERS IN AN EMBEDDED COMPUTING DEVICE

FIELD

This application relates to sharing network interfaces, and in particular to sharing network interfaces between containers on an embedded computing system.

BACKGROUND

Embedded computing devices (hereinafter "embedded devices") are computing devices with specific functions which operate within a larger mechanical or electrical system. Embedded devices are used extensively in consumer, commercial, automotive, industrial and healthcare markets. Generally, the operating system of an embedded device might only run applications which help the embedded device to accomplish a specific task.

Examples of embedded devices include appliances (e.g. dishwashers), banking Automated Teller Machines (ATMs), routers, Point-of-Sale (POS) terminals, and mobile devices (e.g. mobile phones). Some embedded devices can connect to the internet or other computing devices via a network interface, and are colloquially referred to as "smart" devices.

Embedded devices typically run an operating system (OS) that manages hardware and applications. Examples of common operating systems include Unix, Android, Linux, iOS, OS X, and Ubuntu. A typical operating system allocates memory to different processes. An operating system can segregate virtual memory into user space and kernel space. The kernel of an operating system is the central core of the operating system and houses core programs. The kernel space is typically reserved for specific operations associated with the kernel. Application programs typically operate in user space.

Different operating systems may be more suitable for different purposes. For example, for a device with limited processing and storage capabilities, an operating system with a smaller footprint may be more suitable, but may offer reduced functionality and driver support. Operating systems with a larger footprint (e.g. Windows) may be more suitable for computing devices with increased processing and storage capabilities.

Some operating systems allow for multiple virtualized user space instances (referred to herein as "containers"). Separate containers can be isolated from one another, with the kernel providing resource-management features to limit the impact of one container's activities on other containers. Different operating systems can run in separate containers.

Although embedded devices may have limited resources, the use of multiple user-space instances in embedded computing systems is desirable. For example, a smartphone may run a first operating system in a first container and a second operating system in a second container. The first operating system may be responsible for work-related applications. The second operating system may be responsible for personal applications. The use of segregated containers may be desirable when applications and data are intended to be kept separate. In this example, it is desirable for confidential work-related data and applications to be kept separate from the personal applications and personal data of a user.

Because processing power and storage may be limited on an embedded device, it might not be desirable to run multiple virtualized operating systems which have a relatively large footprint (i.e. relatively high computing resource requirements). For example, running instances of both Android and iOS might not be desirable on an embedded computing system with limited resources.

There may be instances in which an operating system running in a first container supports functionality which is not supported by a second operating system. For example, a first operating system may support network connectivity via a network interface, whereas a second, less resource-intensive operating system running on the same device might not provide network connectivity. It would be desirable to share the network interface of the first operating system with the second operating system.

SUMMARY

According to one aspect, there is provided a method of sharing a network interface between virtualized operating systems in an embedded device, the method comprising: providing, by a host operating system running on the embedded device, a network bridge; in a first operating system running in a first container managed by the host operating system, connecting a first shared network interface with the network bridge; in a second operating system running in a second container managed by the host operating system, connecting a second shared network interface with the network bridge; linking, by a first control client in the first operating system, a first external network interface to the first shared network interface; and sharing the first external network interface with the second operating system via the network bridge.

In any of the previous embodiments, the first control client may comprise an Internet Protocol (IP) table configured to route packets between the first external network interface and the second shared network interface.

In any of the previous embodiments, the method may further comprise: linking, by a second control client in the second operating system, a second external network interface to the first shared network interface; and sharing the second external network interface with the first operating system via the network bridge.

In any of the previous embodiments, the method may further comprise: in a third operating system running in a third container managed by the host operating system, connecting a third shared network interface with the network bridge; and sharing the first external network interface with the third operating system via the network bridge.

In any of the previous embodiments, the method may further comprise: in a third operating system running in a third container manager by the host operating system, connecting a third shared network interface with the network bridge; sharing the first external network interface with the third operating system via the network bridge; and sharing the second external network interface with the third operating system via the network bridge.

In any of the previous embodiments, sharing the first external network interface with the second operating system may comprise: sharing the first external network interface with a first number of applications running in the second operating system, wherein the first number of applications is less than a total number of applications running in the second operating system.

In any of the previous embodiments, the first operating system may include a driver for the first external network interface, and the second operating system may lack the driver for the first external network interface.

In any of the previous embodiments, the first external network interface may be one of a hardware-based network interface and a virtual network interface.

In any of the previous embodiments, the second external network interface may be one of a hardware-based network interface and a virtual network interface.

In any of the previous embodiments, the method may further comprise notifying the second operating system that the first external network interface is available for sharing with the second operating system.

According to another aspect, there is provided an embedded device, comprising: a processor; a memory containing computer-readable instructions for execution by said processor, said instructions, when executed by said processor, causing the processor to: provide, by a host operating system, a network bridge; connect, by a first operating system running in a first container managed by the host operating system, a first shared network interface with the network bridge; connect, by a second operating system running in a second container managed by the host operating system, a second shared network interface with the network bridge; link, by a first control client in the first operating system, a first external network interface to the first shared network interface; and share the first external network interface with the second operating system via the network bridge.

In any of the previous embodiments, the first control client may comprise an Internet Protocol (IP) table configured to route packets between the first external network interface and the second shared network interface.

In any of the previous embodiments, the memory may further contain instructions to: link, by a second control client in the second operating system, a second external network interface to the first shared network interface; and share the second external network interface with the first operating system via the network bridge.

In any of the previous embodiments, the memory may further contain instructions to: in a third operating system running in a third container managed by the host operating system, connect a third shared network interface with the network bridge; and share the first external network interface with the third operating system via the network bridge.

In any of the previous embodiments, the memory may further contain instructions to: in a third operating system running in a third container managed by the host operating system, connect a third shared network interface with the network bridge; share the first external network interface with the third operating system via the network bridge; and share the second external network interface with the third operating system via the network bridge.

In any of the previous embodiments, sharing the first external network interface with the second operating system may comprise sharing the first external network interface with a first number of applications running in the second operating system, and the first number of applications may be less than a total number of applications running in the second operating system.

In any of the previous embodiments, the first operating system may include a driver for the first external network interface, and the second operating system may lack the driver for the first external network interface.

In any of the previous embodiments, the first external network interface may be one of a hardware-based network interface and a virtual network interface.

In any of the previous embodiments, the memory may further contain instructions to notify the second operating system that the first external network interface is available for sharing with the second operating system.

BRIEF DESCRIPTION OF THE DRAWINGS

In the figures, which depict example embodiments:

FIG. 9A is a depiction of the contents of an example IP tables for a first control client;

FIG. 9B is a depiction of the contents of an example IP table for a second control client;

FIG. 10 is a block diagram of an example depiction of communication between containers on an embedded device.

These drawings depict aspects of example embodiments for illustrative purposes.

DETAILED DESCRIPTION

Figure 1:
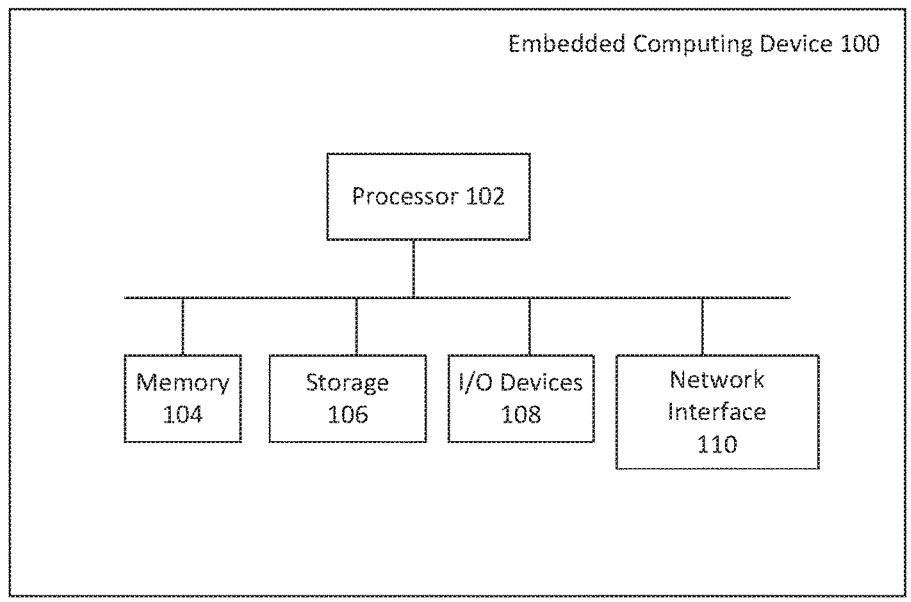
FIG. 1 is a block diagram depicting components of an example embedded computing device.

FIG. 1 is a block diagram of components of an example embedded computing device 100. Embedded computing device 100 may include one or more processors 102, memory 104, storage 106, I/O devices 108, and network interface 110, and combinations thereof.

Processor 102 is any suitable type of processor, such as a processor implementing an ARM or x86 instruction set. In some embodiments, processor 102 is a graphics processing unit (GPU). Memory 104 is any suitable type of random access memory accessible by processor 102. Storage 106 may be, for example, one or more modules of memory, hard drives, or other persistent computer storage devices.

I/O devices 108 include, for example, user interface devices such as a screen, including capacitive or other touch-sensitive screens capable of displaying rendered images as output and receiving input in the form of touches. In some embodiments, I/O devices 108 additionally or alternatively include one or more of speakers, microphones, sensors such as accelerometers and global positioning system (GPS) receivers, keypads, or the like. In some embodiments, I/O devices 108 include ports for connecting embedded computing device 100 to other computing devices. In an example embodiment, I/O devices 108 include a universal serial bus (USB) controller for connection to peripherals or to host computing devices.

Network interface 110 is capable of connecting embedded computing device 100 to one or more communication networks. In some embodiments, network interface 110 includes one or more of wired interfaces (e.g. wired ethernet) and wireless radios, such as WiFi, Bluetooth, or cellular (e.g. GPRS, GSM, EDGE, CDMA, LTE, or the like). Network interface 110 can also be used to establish virtual network interfaces, such as a Virtual Private Network (VPN).

Embedded computing device 100 operates under control of software programs. Computer-readable instructions are stored in storage 106, and executed by processor 102 in memory 104. Software executing on embedded computing device 100 may include, for example, an operating system and application software 122.

Figure 2:
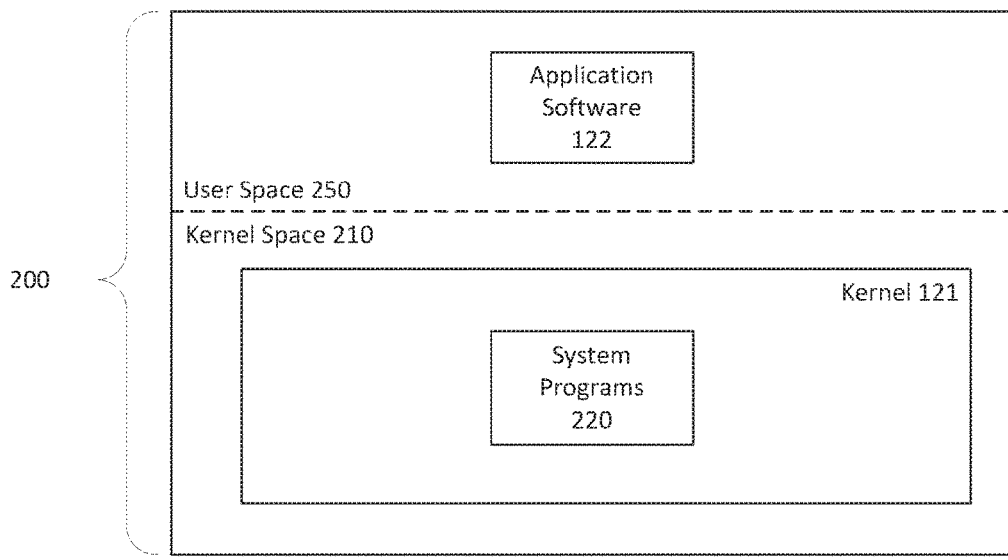
FIG. 2 is depicts a simplified arrangement of virtual memory allocation in an embedded computing device.

FIG. 2 depicts a simplified arrangement of virtual memory allocation in an example embedded computing device 100. As noted above, an operating system includes a kernel 121 that is the central core of the operating system. An operating system can segregate virtual memory 200 into kernel space 210 and user space 250. The kernel space 210 is typically reserved for specific operations associated with the kernel, referred to herein as system programs 220. For example, the system programs 220 may handle system start-up processes and input/output requests from application software by translating requests into data-processing instructions for the processor 102. The kernel executes system programs in kernel space 210. Generally, application software 122 runs in user space 210 and user activities occur in user space 210.

Figure 3:
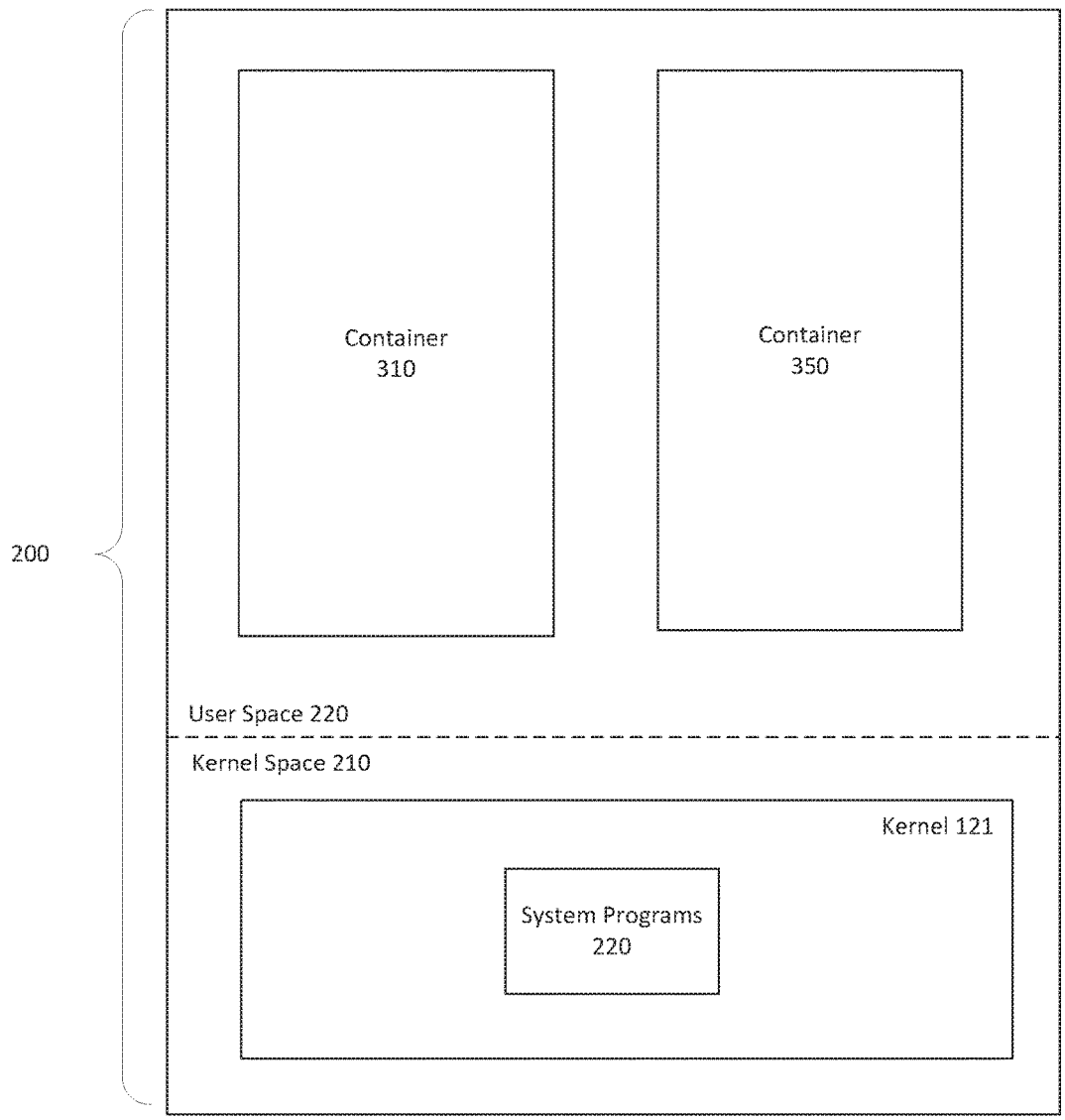
FIG. 3 depicts an example configuration of virtual memory in an embedded computing device which supports multiple user space instances.

As noted above, some operating system kernels 121 support multiple virtualized user space instances (referred to herein as containers). FIG. 3 depicts an example configuration of virtual memory 200 in an embedded computing device 100 which supports multiple containers. As depicted, virtual memory 200 includes two containers 310, 350. Separate containers can be isolated from one another, with the kernel 121 providing resource-management features to limit the impact of one container's activities on other containers. In some embodiments, the memory allocated to container 310 is separate from memory allocated to container 350.

Figure 4:
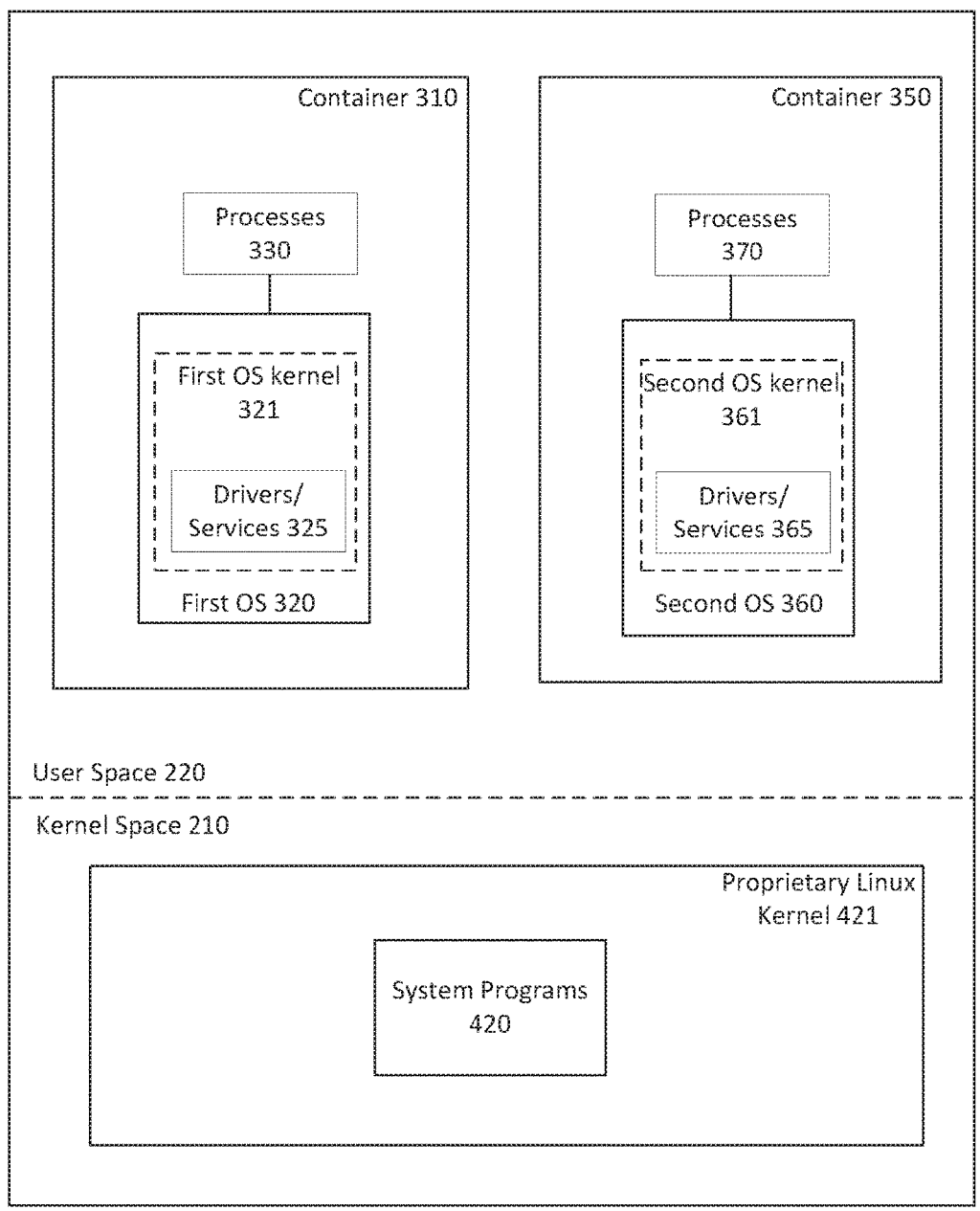
FIG. 4 depicts an example embodiment of an embedded computing device running a host operating system and two operating systems in separate containers.

Each container 310, 350 may execute an instance of an operating system. FIG. 4 depicts an example embodiment in which the host (or native) operating system running on embedded computing device 100 is Linux. In some embodiments, the native operating system may be a proprietary operating system which is based on the Linux kernel 421. A proprietary operating system may be desirable for embedded computing device 100 because the proprietary operating system may be stripped of features which are deemed unnecessary or undesirable. The proprietary operating system may also provide a manufacturer of embedded computing device 100 with a base level of control over the software applications which can be executed on embedded computing device 100.

In the example embodiment of FIG. 4, the system programs 420 in the proprietary Linux kernel 421 include support for multiple virtualized user space instances. As depicted, user space 220 contains a first container 310 and a second container 350. In this example, first container 310 is running a first operating system 320 (e.g. Tizen). In this example, second container 350 is running a second operating system 360 (e.g. a generic version of the Android OS). It should be noted that although the example embodiment of FIG. 4 depicts two different operating systems running in first container 310 and second container 350, the present application also contemplates embodiments in which two different instances of the same operating system are running in containers 310, 350. For example, two separate instances of Android may be running in containers 310, 350.

Throughout the specification, a process includes software applications, underlying processes, and any combination thereof. For example, processes 330 are executing in container 310, and processes 370 are executing in container 350. It should be noted that first operating system 320 and second operating system 360 may also be considered to be processes executing in containers 310 and 350, respectively. Processes 330 may communicate with first OS 320. In particular, processes 330 may make use of drivers and/or services 325 which are present in the kernel 321 of first OS 320. Processes 370 may communicate with second OS 360, and in particular may make use of drivers and/or services 365 which are present in the kernel 361 of second OS 360.

Communication between containers 310, 350 (referred to herein as inter-container communication) is typically highly restricted. Reasons for such restrictions in communication may relate to security or business considerations. For example, if embedded computing device 100 is a smartphone distributed by an employer, container 310 may run an operating system intended to be used for work purposes, whereas container 350 may run an operating system intended to be used for personal use by the user. In this example context, and many other contexts, it is desirable to segregate the degree to which containers are able to interact.

Different operating systems might provide different levels of support for various processes. For example, the kernel 361 of second OS 360 might not provide support for certain network interfaces. That is, drivers/services 365 might not include support for one or more of, e.g., wired ethernet, WiFi (IEEE 802.11a/b/g/n/ac), Bluetooth, or cellular (e.g. GPRS, GSM, EDGE, CDMA, LTE) connections. First OS 320 may provide support for one or more network interfaces not supported by second OS 360. That is, the drivers/services 325 in kernel 321 of first OS 320 may support one or more of the above-noted network interfaces which is not supported by second OS 360. In some embodiments, network interfaces further include virtual network interfaces (e.g. Virtual Private Network (VPN) connections).

According to some embodiments, embedded computing device 100 is configured to share one or more network interfaces with one or more containers 310, 350. For example, first OS 320 running in container 310 can communicate with container 350 to share a network interface (e.g. a WiFi network interface) with second OS 360 in container 350. Thus, the instance of second OS 360 running in container 350 can communicate via the WiFi network interface in spite of the WiFi network interface not being natively supported by the kernel 361 of second OS 360.

Sharing network interfaces between containers may result in numerous benefits, including more efficient use of storage space on embedded device 100. Given that some embedded devices 100 may have limited storage and processing capabilities, the efficient use of storage space and processing capabilities may be an important consideration.

For example, a first operating system which provides broad support for various network interfaces may be running in a first container on embedded device 100. One or more other operating systems may be running in one or more other containers on embedded device 100. The other operating systems might not include drivers for a given type of network interface. Aside from lacking drivers for the given type of network interface, the other operating systems may be suitable for performing specific tasks on embedded device 100, and may require less memory and storage on embedded device 100 relative to the first operating system. It may be possible to run the other operating systems in separate containers on embedded device 100 in addition to the first operating system, whereas embedded device 100 might not have sufficient storage and processing capabilities to run multiple instances of the first operating system in separate containers. Thus, according to some embodiments, the increased driver support provided by the first operating system can be leveraged to provide support for network interfaces to other operating systems that do not include drivers for the network interfaces.

In some embodiments, the operating system which has control over the network interface may share the network interface with another operating system running in a separate container on embedded device 100. In some embodiments, the operating system which has control over the network interface may share the network interface with two or more other operating systems running in respective separate containers on embedded device 100.

In some embodiments, an operating system with access to a first network shares access to the first network with a second operating system that does not have access to or is not capable of interfacing with the first network. For example, the second operating system might not have driver support for the network interface. In some embodiments, the second operating system has access to a second network and shares access to the second network with the first operating system.

Figure 5:
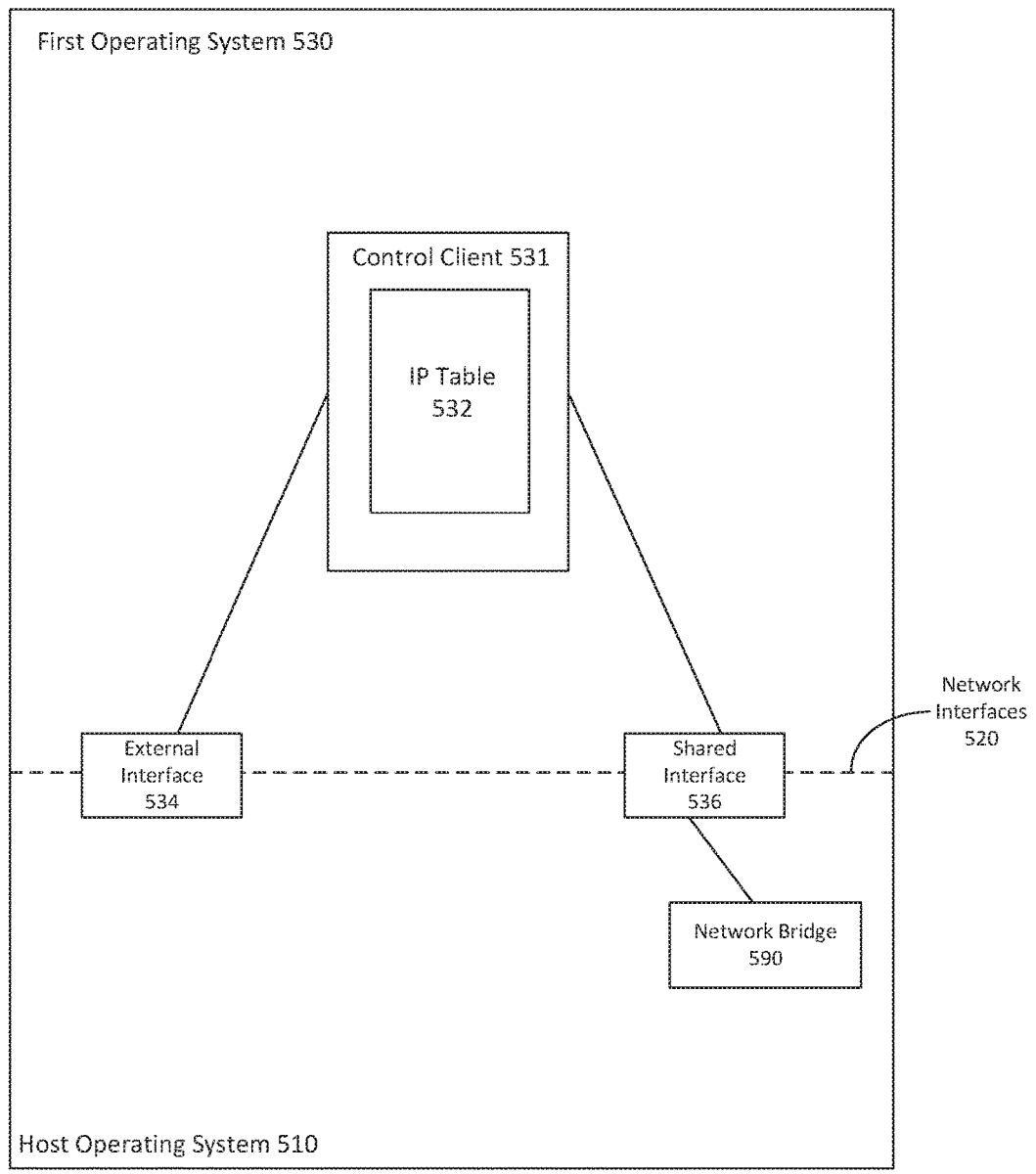
FIG. 5 is a block diagram depicting an example embodiment of an embedded device having multiple network interfaces.

FIG. 5 is a block diagram of an example embodiment of an embedded device having a shared network interface between a host operating system and a first operating system. As depicted, host operating system 510 is the core operating system of the embedded device. In some embodiments, host operating system 510 is a proprietary Linux operating system. In some embodiments, the host operating system 510 provides relatively minimal functionality beyond the operations necessary to execute one or more operating systems. Host operating system 510 may provide access to system programs 420 from the proprietary Linux kernel 421 described above. Host operating system 510 supports multiple containers. In the example embodiment depicted in FIG. 5, only one container is running with an instance of a first operating system 530. In some embodiments, first operating system 530 is Android OS 360 and includes driver support for one or more network interfaces 520.

Host operating system 510 is operable to create a shared network interface 536. Shared network interface 536 allows for communication of network data packets between the host OS 510 and first OS 530. As depicted, embedded computing device 100 also includes an external network interface 534. External network interface 534 may be used to communicate data packets between the first OS 530 and a network or device external to embedded computing device 100.

After loading first operating system 530, first operating system 530 is operable to communicate with external network interface 534. In the example embodiment of FIG. 5, first OS 530 includes driver support for the external network interface 534. The external network interface 534 may be a cellular network interface (e.g. LTE). Alternatively, the external network interface 534 may be any of a wired or wireless local area network (LAN) (e.g. 100-base T ethernet, Gigabit ethernet, 802.11a/b/g/n/ac wireless LAN, Bluetooth, or cellular including GPRS, GSM, EDGE, CDMA, and LTE). In some embodiments, the external network interface 534 is a virtual network interface (e.g. a Virtual Private Network (VPN) interface).

As depicted, first OS 530 includes control client 531. Control client 531 may be implemented as software, hardware, or a combination of software and hardware. Control client 531 is a module which controls communication between external network interface 534 and shared network interface 536. In some embodiments, control client 531 routes data packets received at external network interface 534 to shared network interface 536. In some embodiments, control client 531 routes data packets received at shared network interface 536 to external network interface 534.

External network interface 534 communicates data packets in accordance with various communication protocols (e.g. TCP/IP). Shared network interface 536 is configured to communicate data packets to network bridge 590, which may forward data packets to other shared network interfaces in other containers, as described below. In some embodiments, network bridge 590 is provided by host OS 510. In some embodiments, each shared network interface is visible to host OS 510 and network bridge 590.

In some embodiments, control client 531 uses an Internet Protocol (IP) table 532 to coordinate the routing of data packets between external network interface 534 and shared network interface 536. IP tables contain a list of one or more rules which are used to route data packets from one network interface to another network interface. IP tables are supported by many operating systems, including, for example, Linux and Android. In some embodiments, an IP table 532 may define rules for incoming packets. For example, an IP table 532 may define a rule that some or all incoming data packets for external network interface 534 be forwarded to shared network interface 536. An IP table 532 may also define rules for outgoing data packets from a network interface. For example, an IP table 532 may define a rule that some or all outgoing data packets from shared network interface 536 be forwarded to external network interface 534.

Figure 6A:
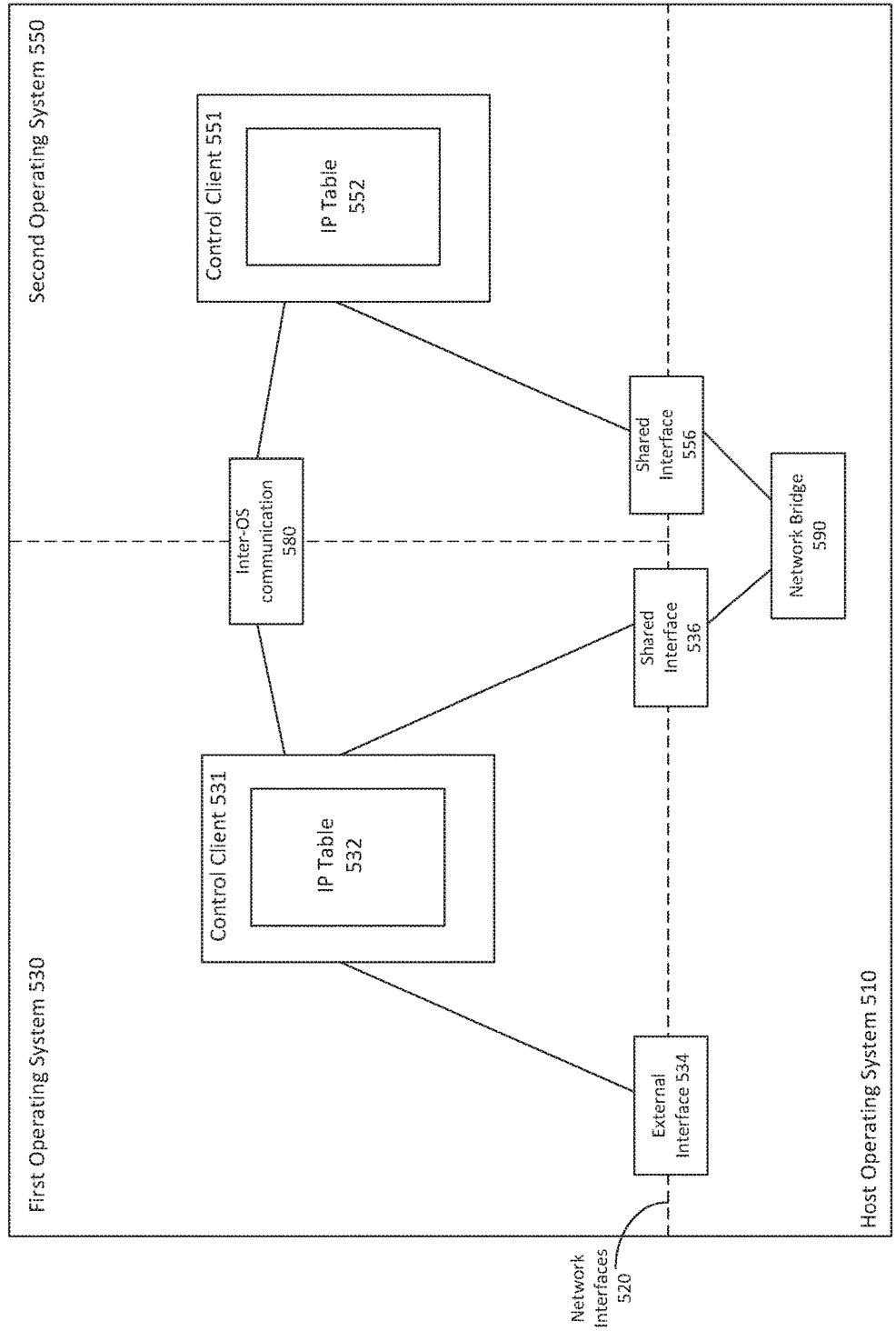
FIG. 6A is a block diagram depicting an example embodiment of an embedded device having two operating systems with multiple network interfaces.

FIG. 6A is a block diagram of an example embodiment of an embedded device having a host OS 510, a first OS 530 running in a first container, and a second OS 550 running in a second container. Each of external network interface 534, shared network interface 536, control client 531, and IP table 532 may function in a manner similar to that described above in relation to FIG. 5. Second OS 550 includes shared network interface 556, control client 551, and IP table 552. In the example embodiment of FIG. 6A, second OS 550 does not have the capability to directly make use of external network interface 534. For example, second OS 550 might not have driver support for the external network interface 534. Thus, in this example, second OS 550 would be unable to make use of external network interface 534 in spite of external network interface 534 being a component in embedded device 100.

In the example of FIG. 6A, each of shared network interface 536 and shared network interface 556 is connected to network bridge 590. Network bridge 590 is provided by host OS 510. Network bridge 590 provides a path for routing data packets between second OS 550 and first OS 530 via host OS 510. It should be noted that in the configuration depicted in FIG. 6A, shared interface 556 is not visible to first OS 530. Similarly, shared interface 536 and external network interface 534 are not visible to second OS 550 because the first OS 530 and second OS 550 are in separate containers. Network bridge 590 is able to detect and communicate with each of external network interface 534, shared network interface 536, and shared network interface 556. In some embodiments, first OS 530 communicates the availability of one or more of external network interface 534 and shared network interface 536 to second OS 550 by way of inter-OS communication 580.

In one example embodiment, an application (e.g. a bar code scanning application) is running in second OS 550 and requires a network connection. When external network interface 534 is shared with second OS 550, data packets from the bar code scanning application can be routed to shared network interface 556. Control client 551 controls the routing of the data packets by way of IP table 552, and the data packets are then sent from shared interface 556, to network bridge 590, to shared interface 536, and then to external network interface 534. The data packets can then be transmitted via external network interface 534.

As with the functioning of shared network interface 556, control client 531 controls the routing of data packets from shared interface 536 to external network interface 534. Thus, the data packets from the bar code scanning application in second OS 550 running in a second container can be routed internally from the second OS 550, to the bridge 590, and then to the first OS 530, where the external network interface 534 will ultimately send the data packets to the intended destination.

In some embodiments, the bar code scanning application in second OS 550 may also receive data packets via external network interface 534. Data packets received at external network interface 534 are routed using rules from IP table 532 to shared interface 536, then to network bridge 590, and then shared interface 556 in second OS 550, which then delivers the data packets to the bar code scanning application running in second OS 550. Thus, the bar code scanning application in second OS 550 (which does not have access to external network interface 534) is able to send and receive data packets by routing packets from the second container to the first container and ultimately to external network interface 534.

In some embodiments, control client 531 shares the external network interface 534 with the second OS 550 at an OS-level. Sharing the external network interface 534 at an OS-level provides access to the external network interface 534 to all applications running in second OS 550. An OS-level sharing policy may be implemented by suitably configured control clients 531 and 551. For example, IP table 552 can be configured to forward data packets from every application to shared interface 556 and then to network bridge 590. Continuing the example, IP table 532 can be configured to forward all data packets received at shared interface 536 to external network interface 534. This would result in all outgoing network traffic from second OS 550 being routed to external network interface 534.

In some embodiments, control clients 531 and 551 restrict the sharing of external network interface 534 on an application-by-application basis. In some embodiments, second OS 550 can provide authorization to particular applications to make use of external network interface 534 when shared. This may be useful in situations where network access for some applications is viewed as being more important or legitimate than network access for other applications. Application authorization may be controlled by control client 551. For example, control client 551 may receive packet data transmission requests from various applications running in second OS 550. Control client 551 can be configured to block the request for packet data transmission based on the application requesting network data transmission. Control client 551 can also be configured to allow the request for packet data transmission based on the application requesting transmission being authorized.

In some embodiments, control client 551 maintains a list of applications which are blocked from transmitting packet data to shared interface 556 (a "black list") while allowing any other application by default. In some embodiments, control client 551 maintains a list of applications which are authorized to transmit packet data to shared interface 556 (a "white list") while blocking any other application not in the list by default. The use of a white list may be desirable from a security perspective because an embedded device 100 which has been hacked or otherwise compromised still might not be able to transmit packet data from other illegitimate applications if those other applications are not contained in the white list.

In an example embodiment, first OS 530 is running in a container used for work purposes on an embedded device 100 provided by an employer to an employee. Second OS 550 is running in a container intended for personal use. In this example embodiment, an email application running in second OS 550 may be authorized to make use of external network interface 534, whereas a social media application (e.g. Facebook) running in second OS 550 might not be authorized to make use of external network interface 534. Thus, the external network interface 534 may be shared with less than all of the applications running on second OS 550.

Figure 6B:
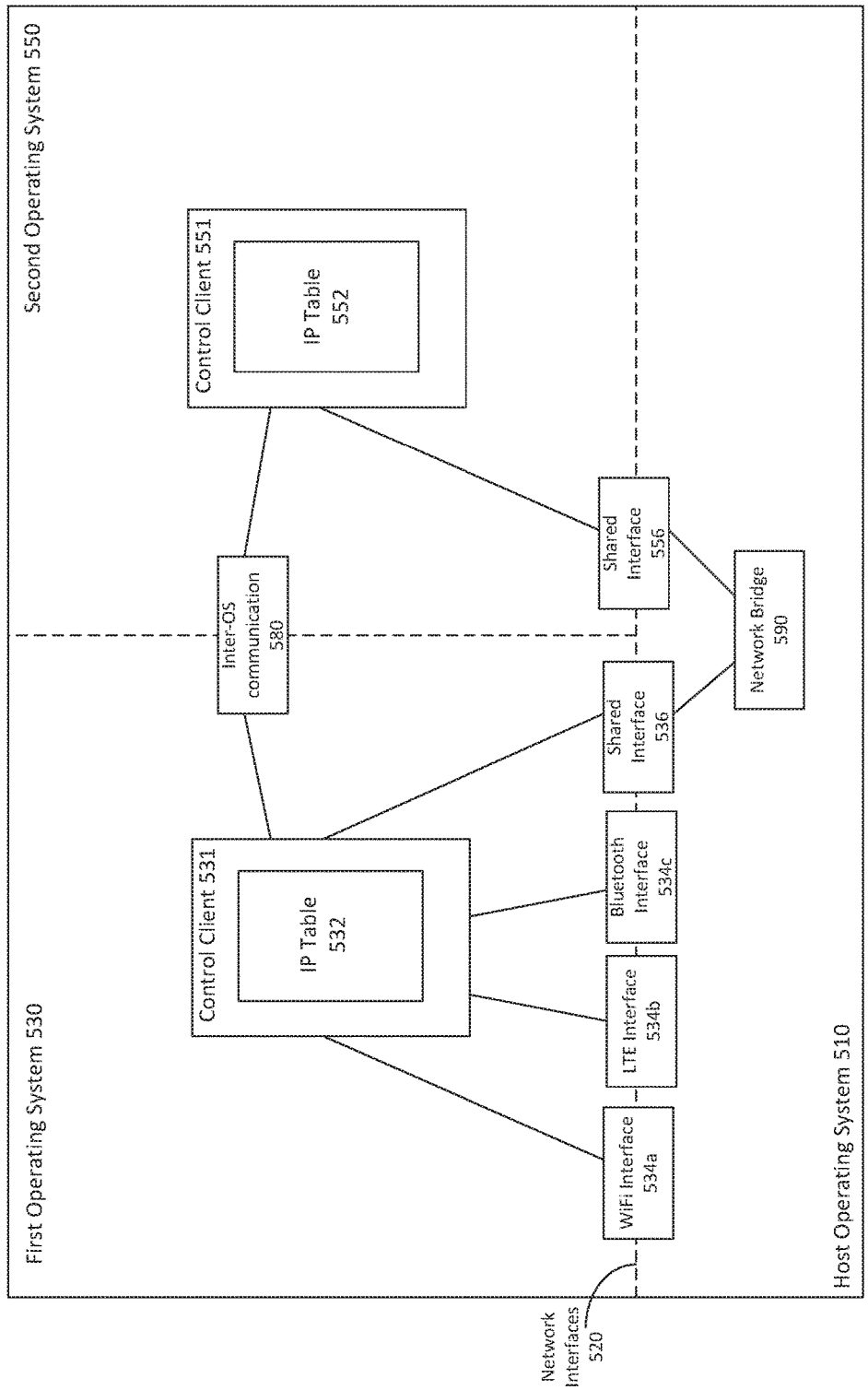
FIG. 6B is a block diagram of an example embodiment of an embedded device having a host OS, a first OS running in a first container, and a second OS running in a second container.

FIG. 6B is a block diagram of an example embodiment of an embedded device having a host OS 510, a first OS 530 running in a first container, and a second OS 550 running in a second container. In some embodiments, the embedded device 100 has several different external network interfaces 534. As depicted, the embedded device 100 has a WiFi interface 534$a$, a cellular LTE interface 534$b$, and a Bluetooth interface 534$c$. First OS 530 may include driver support for one or more of external network interfaces 534$a$, 534$b$, 534$c$.

In some embodiments, control client 531 enables the sharing of one, all, or any combination of the supported external network interfaces 534$a$, 534$b$, 534$c$ with second OS 550. Thus, in some embodiments, first OS 530 might only share a WiFi interface 534$a$ with second OS 550, without sharing the cellular LTE interface 534$b$ or Bluetooth interface 534$c$ with second OS 550. This configuration may be useful in situations where an application on second OS 550 is attempting to transfer a large amount of data, which may incur significant carrier data fees. By sharing only the WiFi interface 534$a$ with second OS 550, this may ensure that the application can only transmit data when a WiFi connection has been established, and may avoid using carrier data and incurring overage fees.

The sharing of some or all of external network interfaces 534$a$, 534$b$, 534$c$ may be enabled by client control 531. In some embodiments, the IP table 532 contains rules causing data packets received at shared interface 536 to be forwarded to WiFi interface 534$a$. In the absence of a rule in the IP table 532 for forwarding data packets to interfaces 534$b$ or 534$c$, second OS 550 might be prevented from using either of LTE interface 534$b$ or Bluetooth interface 534$c$. It should be appreciated by a person skilled in the art that various rules can be implemented in the IP table 532 to implement the appropriate network interface sharing configuration. For example, data packets emanating from a particular application may be routed to WiFi interface 534*a*, and data packets emanating from a second application (e.g. Facebook) may be forwarded to LTE interface 534*b*.

Figure 6C:
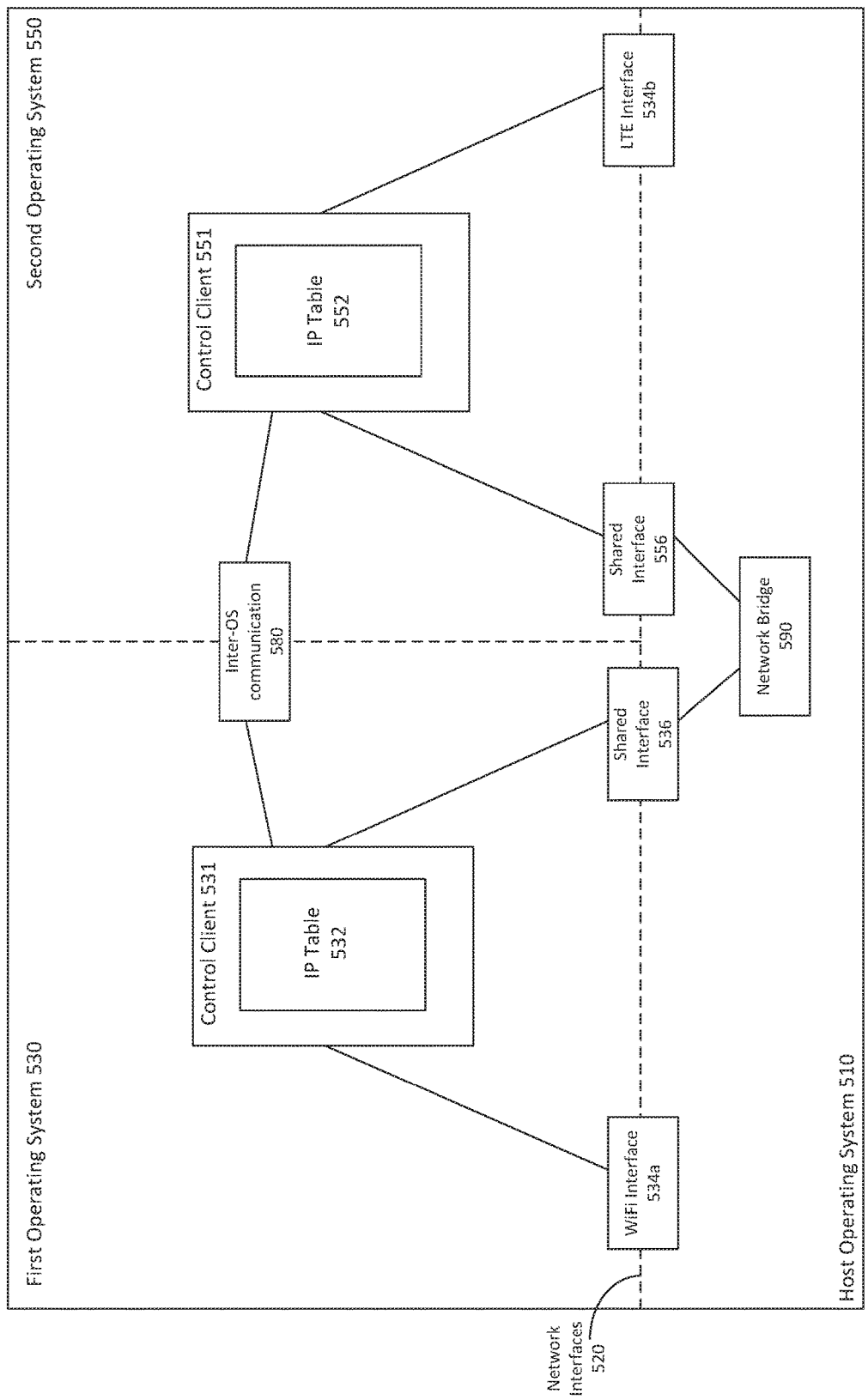
FIG. 6C is a block diagram of an example embodiment of an embedded device having a host OS, a first OS running in a first container, and a second OS running in a second container.

FIG. 6C is a block diagram of an example embodiment of an embedded device having a host OS 510, a first OS 530 running in a first container, and a second OS 550 running in a second container. In the example embodiment of FIG. 6C, the first OS 530 can make use of a WiFi interface 534*a*, and the second OS 550 can make use of LTE interface 534*b*. In this embodiment, the first OS 530 does not have drivers for LTE interface 534*b*, and the second OS 550 does not have drivers for WiFi interface 534*a*.

According to some embodiments, LTE interface 534*b* can be shared with first OS 530, and WiFi interface 534*a* can be shared with second OS 550. Control client 531 can be configured to route certain packets to shared network interface 536, and ultimately to shared network interface via network bridge 590. Control client 551 can be configured to route data packets received at shared interface 556 to LTE interface 534*b*, thus providing the first OS 530 with the capability of using LTE interface 534*b*. Second OS 550 can also make use of WiFi interface 534*a* in a manner similar to that described in relation to FIG. 6A. Provided the IP tables 532 and 552 are configured appropriately, each of first OS 530 and second OS 550 can share an external network interface with each of second OS 550 and first OS 530, respectively.

Figure 7:
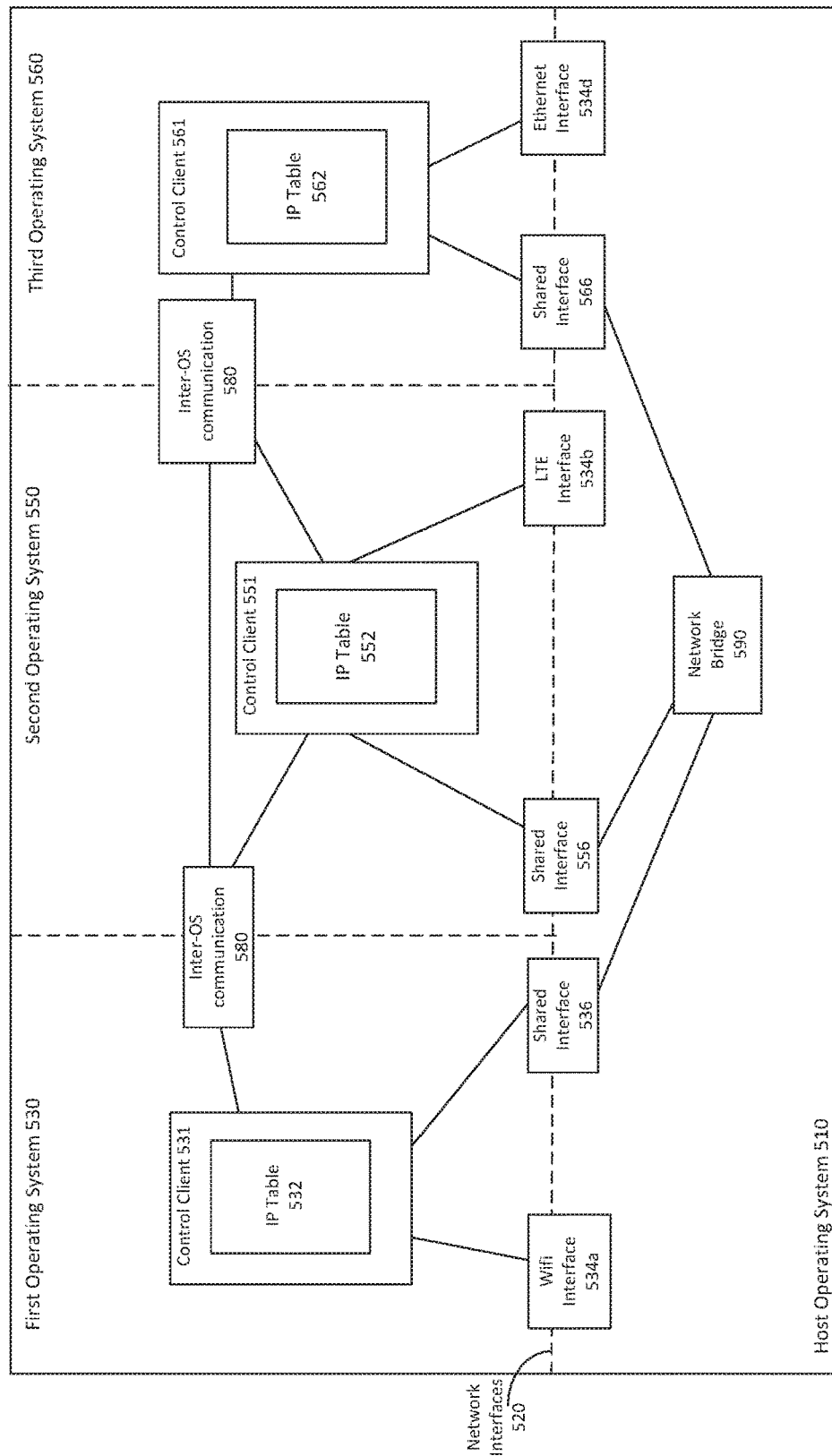
FIG. 7 is a block diagram of an example embedded device which has a host OS, a first OS, a second OS, and a third OS.

FIG. 7 is a block diagram of an example embedded device which has of a host OS 510, a first OS 530, a second OS 550, and a third OS 560. The host OS 510 provides network bridge 590. Each of shared interfaces 536, 556 and 566 is visible to network bridge 590. Network bridge 590 allows for communication between each of shared interfaces 536, 556 and 566. As depicted, each of first OS 530, second OS 550 and third OS 560 has a respective control client 531, 551, 561, IP tables 532, 552, 562, and shared interfaces 536, 556, 566.

As depicted, first OS 530 has drivers for WiFi interface 534*a*, second OS 550 has drivers for LTE interface 534*b*, and third OS 560 has drivers for Ethernet interface 534*d*. Depending on the desired configuration, first OS 530 can share WiFi interface 534*a* with one, both, or none of second OS 550 and third OS 560. Second OS 550 can share LTE interface 534*b* with one, both, or none of first OS 530 and third OS 560. Third OS 560 can share ethernet interface 534*d* with one, both, or none of first OS 530 and second OS 550. Each of these configurations is possible with appropriately configured IP tables 532, 552, 562 for routing data packets to the appropriate shared network interface and through network bridge 590.

Although the depiction in FIG. 7 shows three operating systems running on embedded device 100, it should be appreciated that this configuration can be generalized to any number of operating systems, provided the embedded device has sufficient memory and processing power to run that number of operating systems. In some embodiments, one external network interface 534 is shared with one other operating system. In some embodiments, one external network interface 534 is shared with two or more other operating systems. In some embodiments, two or more external network interfaces are shared with one other operating system. In some embodiments, two or more external network interfaces are shared with two or more other operating systems.

Figure 8:
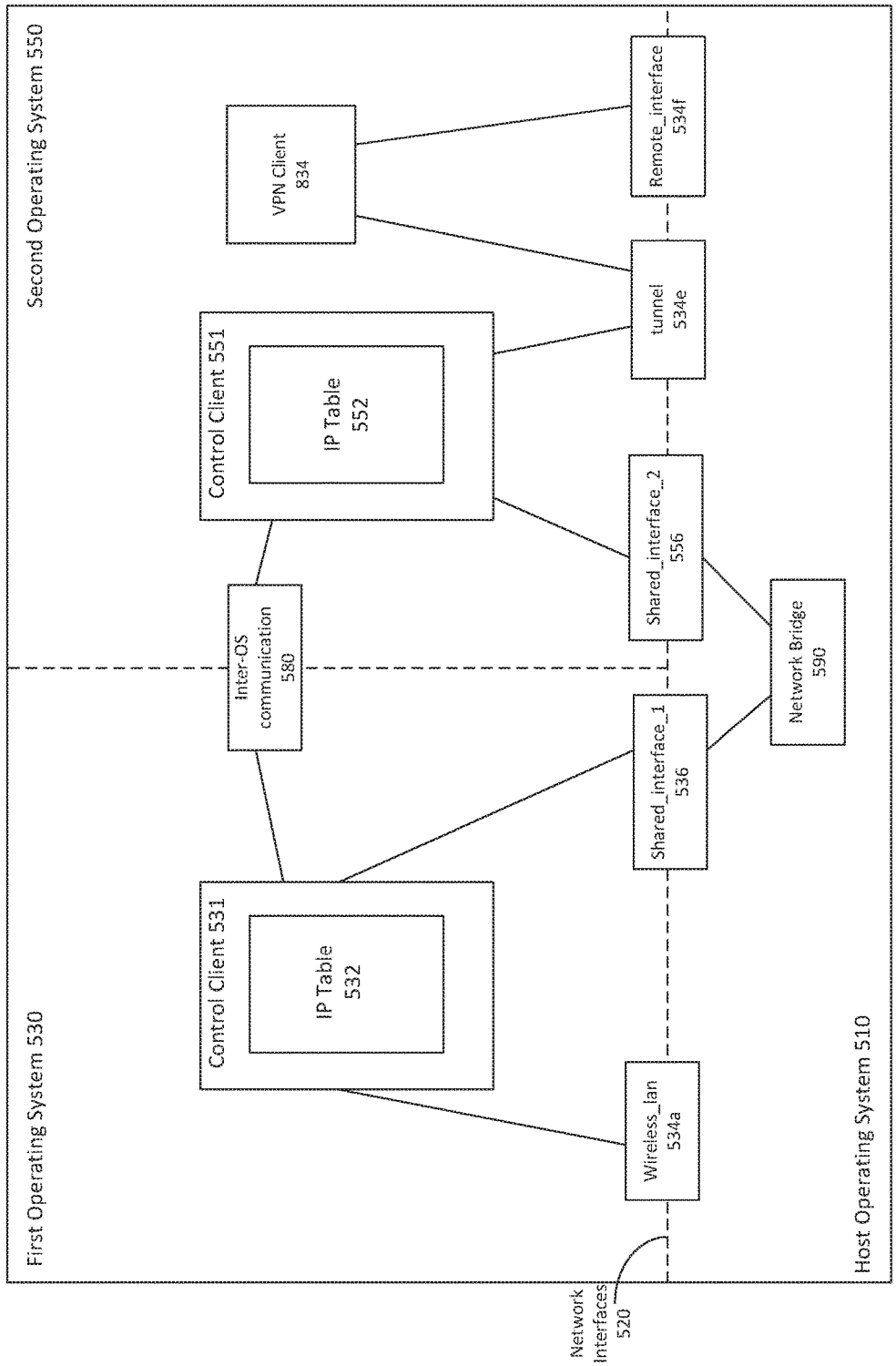
FIG. 8 is a block diagram of an example embedded device configured to share a virtual network interface.

FIG. 8 is a block diagram of an example embedded device configured to share a virtual network interface. As depicted, the embedded device of FIG. 8 includes a host OS 510, a first OS 530, and a second OS 550. In the example embodiment of FIG. 8, the labels for various interfaces correspond to entries in the IP tables 532 and 552 in FIGS. 9A and 9B below. First 530 has drivers for an external network interface, wireless_lan 534*a* and a shared network interface, shared_interface_1 536. Second OS 550 has drivers for a shared network interface, shared_interface_2 556, and a virtual private network (VPN) connection, denoted as tunnel 534*e*. Data packets can be routed from tunnel 534*e* to VPN client 834, and then to another network, remote_interface 534*f*.

One or more applications executing in first OS 530 may require the use of a VPN connection to communicate with remote_interface 534*f*. In the embodiment shown in FIG. 8, first OS 530 does not have the drivers to support a VPN connection. Second OS 550 supports VPN connections and has a connection to remote_interface 534*f* via a VPN tunnel, denoted as tunnel 534*e*. In the example of FIG. 8, second OS 550 can share the connection to remote_interface 534*e* with applications running in first OS 530.

Control client 551 in second OS 550 has an IP table 552 configured to redirect data packets incoming at tunnel 534*e* to shared_interface_2 556. IP table 552 is further configured to forward data packets outgoing from tunnel 534*e* to shared_interface_2 556. IP table 532 in first OS 530 is configured to route all data packets to shared_interface_1 536 and ultimately to shared_interface_2 556. FIGS. 9A and 9B are a depiction of the contents of example IP tables 532 and 552, respectively. As depicted, the IP table 532 for the first OS 530 defines a number of network interfaces at 910, and a routing rule at 920. IP table 552 for the second OS 550 also defines a number of network interfaces at 930, and a set of routing rules at 940.

In various embodiments described above, one or more of the operating systems may be notified when an external network interface 534 has been made available for sharing with second OS 550 or other operating systems by first OS 530. Notifications may be used in creating routing rules for IP tables in various operating systems. In some embodiments, the first OS 530 sends a notification to second OS 550 by way of inter-OS communication 580.

Inter-OS communication may occur in a number of different forms. FIG. 10 is a block diagram of an example depiction of communication between containers on an embedded device. In FIG. 10, virtual memory 1100 is segregated into user space 1120 and kernel space 1140. As described above, kernel space 1140 is reserved for specific system operations associated with kernel 1160, which houses core programs 1180. A number of containers 1200, 1220, 1240, 1260 are provided in user space 1120.

In the example embodiment of FIG. 10, communication between a first process 1280 (e.g. a first operating system 530 or an application running in first operating system 530) in a first container 1200 and a second process 1300 in a second container 1220 is performed via a buffer process 1320. The buffer process 1320 controls the communication between the first process 1280 and the second process 1300. In some embodiments, communication between first process 1280 and second process 1300 is contingent upon a determination that communication between the first process 1280 and second process 1300 is authorized. Such a determination may be based on the entities attempting to communicate (e.g. an authorization for communication between the two containers 1200 and 1220) or based on the properties of the message being communicated (e.g. a message relating to the availability of first external network interface 534 may be authorized to be communicated between containers to different operating systems).

In some embodiments, a buffer process 1320 determines whether the communication is authorized. In some embodiments, an authorization process separate from the buffer process 1320 determines whether the communication is authorized, and provides an indication to buffer process 1320 as to whether the communication is authorized. In some embodiments, the determination is made based on authorization data 1340 accessible to the buffer process 1320. The authorization data 1340 may define restrictions on communications. Such restrictions can specify combinations of processes and/or containers which are allowed to communicate. Such restrictions can also specify particular types of communications which are allowed for specific process or container combinations.

A person skilled in the art should appreciate that various communication paths are possible between processes and containers shown in FIG. 10. For example, process 1300 can communicate a message to two processes 1360, 1380 running in container 1240 via buffer process 1320. Process 1300 can communicate a message to one process in container 1240 and to one process 1280 in container 1200. Process 1280 can communicate a message to process 1400 via buffer 1320, and then via process 1300. As can be understood from the preceding examples, communication via the buffer process 1320 can be authorized for selected combinations of processes.

An example method of performing inter-OS communication between a first (source) process 1280 (e.g. first OS 530) and a second (destination) process 1300 (e.g. second OS 550) begins with the first process 1280 sending a message to the buffer process 1320. The buffer process may examine the source and destination processes as well as the contents of the communication to determine whether the communication is authorized. If the buffer process 1320 determines that the communication is authorized, the communication is delivered to the destination process 1300. If the buffer process determines that the communication is not authorized, the communication is not delivered to the destination process. In some embodiments, different processes or containers may have different privileges for inter-OS communication. For example, authorization may be operating system-based, in which case all communications may be allowed between specific combinations of containers or operating systems. Alternatively, authorization can be process- or application-based, in which communications can be allowed between specific combinations of processes.

Inter-OS communication 580 may be used to notify an operating system that an external network interface 534 and/or shared network interface 536 has been activated or otherwise become available. For example, in the example of FIG. 6A, when external network interface 534 has been established and made available, control client 531 can send an inter-OS communication to control client 551 using inter-OS communication 580. The communication may include, for example, any one or more of an identifier and corresponding IP or MAC addresses for one or more network interfaces. If the communication between the two operating systems is authorized, the recipient operating system can use the contents of the communication to update IP tables and/or permissions within the control client to reflect the current state of available connections and routing configurations.

Figure 11:
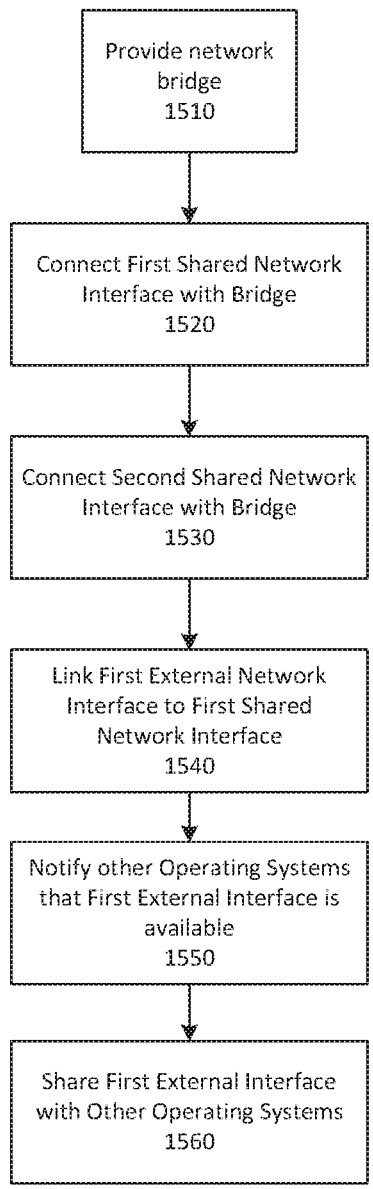
FIG. 11 is a flow chart of an example method of sharing a network interface between virtualized operating systems in an embedded device.

FIG. 11 is a flow chart of an example method of sharing a network interface between virtualized operating systems in an embedded device 100. At 1510, the host operating system 510 provides a network bridge 590 which is available to at least two containers. In some embodiments, the network bridge is initialized upon startup of the embedded device. At 1520, a first operating system 530 running in a first container of the embedded device connects a first shared network interface 536 to the network bridge 590. At 1530, a second operating system 550 running in a second container of the embedded device connects a second shared network interface 556 to the network bridge 590. In some embodiments, one or more of the operating systems 530, 550 creates a shared network interface upon startup.

At 1540, a first external network interface 534 in first operating system 530 is linked to the first shared network interface 536 by control client 531. In some embodiments, the first external network interface 534 may be a physical (e.g. ethernet, WiFi, LTE) interface or a virtual interface (e.g. VPN connection). In some embodiments, linking first external network interface to first shared network interface 536 comprises creating one or more rules in an IP table 532 which controls the routing of data packets in first operating system 530.

At 1550, the second operating system 550 is notified that the external network interface 534 is active and has been made available. In some embodiments, the notifications are made using inter-OS communication, as described above. In some embodiments, other operating systems including or in addition to second operating system 550 are notified that the external network interface 534 has been activated and made available.

At 1560, the first external network interface 534 is shared with the second operating system 550 and can transmit and/or receive data packets routed via shared network interface 556. In some embodiments, the first external network interface 534 is shared with one or more of second operating system 550 and any other operating systems which are executing on embedded device 100.

In some embodiments, sharing a first external network interface 534 comprises configuring one or more IP tables 532, 552 to define rules for routing data packets to the first external network interface 534. In some embodiments, the IP tables 532, 552 may be configured so as to make the first external network interface 534 the default route for network traffic for the second operating system 550. Alternatively, the first external network interface 534 may be set as the default route for network traffic for one or more additional operating systems in addition to second operating system 550.

In some embodiments, sharing the first external network interface 534 comprises setting permissions for access to the first external network interface 534 on an application-by-application basis. For example, the control client 551 in the second operating system 550 may be configured to block network traffic from a particular application (e.g. Facebook) from being forwarded to the shared network interface 556, whereas the control client 551 may be configured to allow network traffic from a different application (e.g. an email application) to be routed to the shared network interface 556 and ultimately to the first external network interface 534.

In some embodiments, the method further comprises sharing additional external network interfaces 534 with other operating systems. For example, in some embodiments, second OS 550 may have access to an LTE interface 534b to which first OS 530 does not have access. In some embodiments, the LTE interface 534b may be shared with first OS 530 using similar techniques as those described above.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps.

As can be understood, the detailed embodiments described above and illustrated are intended to be examples only. Variations, alternative configurations, alternative components and modifications may be made to these example embodiments. The invention is defined by the claims.

What is claimed is:

1. A method comprising:
   in a first container managed by a host operating system running on an embedded device, running a first operating system and connecting a first shared network interface provided by the host operating system with a network bridge provided by the host operating system, the network bridge configured to route data packets between the first shared network interface and a second shared network interface connected to the network bridge, the second shared network interface configured to route data packets between the host operating system and a second operating system running in a second container managed by the host operating system;
   linking, by a first control client included in the first operating system, a first external network interface to the first shared network interface to route data packets between the first external network interface and the first shared network interface, the first external network interface configured to route the data packets between a network or device external to the embedded device and the first shared network interface, the first external network interface being inaccessible by the second operating system; and
   sharing, by the first control client, the first external network interface with the second shared network interface via the network bridge to route data packets between the second shared network interface and the first external network interface.

2. The method of claim 1, wherein the first control client comprises an Internet Protocol (IP) table configured to route the data packets between the first external network interface and the second shared network interface.

3. The method of claim 1, further comprising:
   linking, by a second control client included in the second operating system, a second external network interface to the second shared network interface to route data packets between the second external network interface and the second shared network interface; and
   sharing, by the second control client, the second external network interface with the first shared network interface via the network bridge to route data packets between the first shared network interface and the second external network interface.

4. The method of claim 1, further comprising:
   in a third container managed by the host operating system, running a third operating system and connecting a third shared network interface provided by the host operating system with the network bridge, the network bridge being configured to route data packets between the third shared network interface and the first shared network interface connected to the network bridge; and
   sharing, by a third control client included in the third operating system, the first external network interface with the third shared network interface via the network bridge to route data packets between the third shared network interface and the first external network interface.

5. The method of claim 3, further comprising:
   in a third container managed by the host operating system, running a third operating system and connecting a third shared network interface provided by the host operating system with the network bridge, the network bridge being configured to route data packets between the third shared network interface and the first and second shared network interfaces connected to the network bridge;
   sharing, by a third control client included in the third operating system, the first external network interface with the third shared network interface via the network bridge to route data packets between the third shared network interface and the first external network interface; and
   sharing, by the second control client included in the second operating system, the second external network interface with the third shared network interface via the network bridge to route data packets between the third shared network interface and the second external network interface.

6. The method of claim 2, wherein sharing the first external network interface with the second shared network interface comprises:
   sharing the first external network interface with a number of authorized applications running in the second container, the authorized applications each having an entry in the IP table, wherein the number of authorized applications is less than a total number of applications running in the second container.

7. The method of claim 1, wherein the first operating system includes a driver for the first external network interface, and wherein the second operating system lacks the driver for the first external network interface.

8. The method of claim 1, wherein the first external network interface is one of a hardware-based physical network interface and a virtual network interface.

9. The method of claim 3, wherein the second external network interface is one of a hardware-based physical network interface and a virtual network interface.

10. The method of claim 1, further comprising sending, by the first control client, a notification to a second control client included in the second operating system to notify the second control client that the first external network interface is available for sharing with the second operating system.

11. The method of claim 10, wherein the notification is an inter-OS communication and includes an identifier and an address for the first external network interface.

12. An embedded device, comprising:
    a processor;
    a memory containing computer-readable instructions for execution by said processor, said instructions, when executed by said processor, causing the processor to:
       run a host operating system;
       in a first container managed by the host operating system, run a first operating system and connect a first shared network interface provided by the host operating system with a network bridge provided by the host operating system, the network bridge configured to route data packets between the first shared network interface and a second shared network interface connected to the network bridge, the second shared network interface configured to route data packets between the host operating system and a second operating system running in a second container managed by the host operating system;

link, by a first control client included in the first operating system, a first external network interface to the first shared network interface to route data packets between the first external network interface and the first shared network interface, the first external network interface configured to route the data packets between a network or device external to the embedded device and the first shared network interface, the first external network interface being inaccessible by the second operating system; and share, by the first control client, the first external network interface with the second shared network interface via the network bridge to route data packets between the second shared network interface and the first external network interface.

13. The embedded device of claim 12, wherein the first control client comprises an Internet Protocol (IP) table configured to route the data packets between the first external network interface and the second shared network interface.

14. The embedded device of claim 12, wherein the memory further contains instructions to:
  link, by a second control client included in the second operating system, a second external network interface to the second shared network interface to route data packets between the second external network interface and the second shared network interface; and
  share, by the second control client, the second external network interface with the first shared network interface via the network bridge to route data packets between the first shared network interface and the second external network interface.

15. The embedded device of claim 12, wherein the memory further contains instructions to:
  in a third container managed by the host operating system, run a third operating system and connect a third shared network interface provided by the host operating system with the network bridge, the network bridge being configured to route data packets between the third shared network interface and the first shared network interface connected to the network bridge; and
  share, by a third control client included in the third operating system, the first external network interface with the third shared network interface via the network bridge to route data packets between the third shared network interface and the first external network interface.

16. The embedded device of claim 14, wherein the memory further contains instructions to:
  in a third container managed by the host operating system, run a third operating system and connect a third shared network interface provided by the host operating system with the network bridge, the network bridge being configured to route data packets between the third shared network interface and the first and second shared network interfaces connected to the network bridge;
  share, by a third control client included in the third operating system, the first external network interface with the third shared network interface via the network bridge to route data packets between the third shared network interface and the first external network interface; and
  share, by the second control client included in the second operating system, the second external network interface with the third shared network interface via the network bridge to route data packets between the third shared network interface and the second external network interface.

17. The embedded device of claim 13, wherein sharing the first external network interface with the second shared network interface comprises sharing the first external network interface with a number of authorized applications running in the second container, each of the authorized applications having an entry in the IP table, wherein the number of authorized applications is less than a total number of applications running in the second container.

18. The embedded device of claim 12, wherein the first operating system includes a driver for the first external network interface, and wherein the second operating system lacks the driver for the first external network interface.

19. The embedded device of claim 12, wherein the first external network interface is one of a hardware-based physical network interface and a virtual network interface.

20. The embedded device of claim 12, wherein the memory further contains instructions to send, by the first control client, a notification to a second control client included in the second operating system to notify the second control client that the first external network interface is available for sharing with the second operating system.

* * * * *